United States Patent
Park et al.

(10) Patent No.: US 9,933,651 B2
(45) Date of Patent: Apr. 3, 2018

(54) LIQUID CRYSTAL DISPLAY COMPRISING A PLURALITY OF COLOR FILTERS EACH HAVING AT LEAST ONE PROTRUSION AND AT LEAST ONE CHAMFERED PORTION AT DIFFERENT EDGES OF A PIXEL AREA

(71) Applicant: SAMSUNG DISPLAY CO., LTD., Yongin, Gyeonggi-Do (KR)

(72) Inventors: Ki Soo Park, Hwaseong-si (KR); Wan-Soon Im, Cheonan-si (KR); Hyung June Kim, Anyang-si (KR); Jong Hak Hwang, Yongin-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 174 days.

(21) Appl. No.: 14/631,008

(22) Filed: Feb. 25, 2015

(65) Prior Publication Data

US 2016/0062177 A1 Mar. 3, 2016

(30) Foreign Application Priority Data

Sep. 2, 2014 (KR) .................. 10-2014-0116258

(51) Int. Cl.
*G02F 1/1335* (2006.01)
*G02F 1/1362* (2006.01)

(52) U.S. Cl.
CPC ............... *G02F 1/133514* (2013.01); *G02F 2001/136222* (2013.01); *G02F 2201/52* (2013.01)

(58) Field of Classification Search
CPC ............... G02F 2201/52; G02F 2001/136222
See application file for complete search history.

(56) References Cited

U.S. PATENT DOCUMENTS

| 2004/0080844 A1* | 4/2004 | Cheng | G02B 5/201 359/885 |
|---|---|---|---|
| 2004/0095521 A1* | 5/2004 | Song | G02F 1/133514 349/61 |
| 2004/0169807 A1* | 9/2004 | Rho | G02F 1/133514 349/139 |
| 2005/0036221 A1* | 2/2005 | Cheng | G02B 5/201 359/885 |
| 2006/0250536 A1* | 11/2006 | Kim | G02F 1/136209 349/43 |
| 2008/0259255 A1* | 10/2008 | Chae | G02F 1/13394 349/106 |

(Continued)

FOREIGN PATENT DOCUMENTS

| KR | 10-2006-0077880 A | 7/2006 |
|---|---|---|
| KR | 10-2013-0001628 A | 1/2013 |
| KR | 10-2013-0072469 A | 7/2013 |

*Primary Examiner* — Paul Lee
(74) *Attorney, Agent, or Firm* — Lee & Morse, P.C.

(57) ABSTRACT

A liquid crystal display including: a first display panel defining a plurality of pixel areas; a second display panel facing the first display panel; a liquid crystal layer interposed between the first display panel and the second display panel; and a plurality of color filters disposed in the respective pixel areas, wherein four different color filters are respectively disposed in four adjacent pixel areas, and each of the four color filters includes first and second protrusions formed at first and second edges of the corresponding pixel area and first and second chamfered portions at third and fourth edges thereof.

12 Claims, 13 Drawing Sheets

(56) References Cited

U.S. PATENT DOCUMENTS

| | | | |
|---|---|---|---|
| 2010/0136868 A1* | 6/2010 | Chien | G06F 3/0412 445/24 |
| 2010/0182549 A1* | 7/2010 | Miyashita | G02F 1/133514 349/106 |
| 2012/0326950 A1* | 12/2012 | Park | G09G 3/3607 345/55 |
| 2013/0300640 A1* | 11/2013 | Ben-Chorin | G09G 3/3607 345/88 |

* cited by examiner

LIQUID CRYSTAL DISPLAY COMPRISING A PLURALITY OF COLOR FILTERS EACH HAVING AT LEAST ONE PROTRUSION AND AT LEAST ONE CHAMFERED PORTION AT DIFFERENT EDGES OF A PIXEL AREA

CROSS-REFERENCE TO RELATED APPLICATION

Korean Patent Application No. 10-2014-0116258, filed on Sep. 2, 2014, in the Korean Intellectual Property Office, and entitled: "Liquid Crystal Display Device and Manufacturing Method Thereof," is incorporated by reference herein in its entirety.

BACKGROUND

1. Field

Embodiments relate to a liquid crystal display and a manufacturing method thereof, and more particularly, to a liquid crystal display including an island type of color filter and a manufacturing method thereof.

2. Description of the Related Art

A liquid crystal display, which is one of the most common types of flat panel displays currently in use, includes two sheets of display panels with field generating electrodes, e.g., a pixel electrode, a common electrode, and the like, and a liquid crystal layer interposed therebetween. In the liquid crystal layer, voltages are applied to the field generating electrodes to generate an electric field in the liquid crystal layer. Then, the alignment of liquid crystal molecules of the liquid crystal layer is determined by the electric field to control the polarization of incident light, thereby displaying images.

Among the liquid crystal displays, a vertically aligned (VA) mode liquid crystal display in which long axes of the liquid crystal molecules are arranged to be perpendicular to upper and lower display panels while electric fields are not applied is in the spotlight because its contrast ratio is high and it is easy to implement a wide standard viewing angle.

Three color filters (red, green, and blue) or four color filters (red, green, blue, and white) may be employed to convert incident light in the liquid crystal display into constituent components. When using three color filters, the same color filters may be disposed in a column direction (or row direction). When using four color filters, the color filters are disposed in an island pattern.

SUMMARY

An exemplary embodiment is directing to providing a liquid crystal display including: a first display panel configured to define a plurality of pixel areas; a second display panel configured to face the first display panel; a liquid crystal layer interposed between the first display panel and the second display panel; and a plurality of color filters disposed in the respective pixel areas, wherein four different color filters are respectively disposed in four adjacent pixel areas, and each of the four color filters includes two protrusions formed at two edges of four edges of the corresponding pixel area and two chamfered portions formed at the remaining edges thereof.

The protrusion may overlap the chamfered portion of a color filter that is adjacent thereto.

Each of the color filters may include: a body configured to cover most areas of the corresponding pixel; a first protrusion and a second protrusion respectively formed at two edges of the pixel area which diagonally face each other; and a first chamfered portion and a second chamfered portion respectively formed at the remaining edges of the pixel area.

The first protrusion may be formed at a right side of a reference line that connects an upper right edge of the pixel area and a lower left edge thereof, the second protrusion may be formed at left side of the reference line, the first chamfered portion may be formed at an upper left edge of the pixel area, and the second chamfered portion may be formed at a lower right side of the pixel area.

The first protrusion may overlap a first chamfered portion of a first different color filter which is rightwardly adjacent to the color filter, and the second protrusion may overlap a second chamfered portion of a second different color filter which is leftwardly adjacent to the color filter.

The first protrusion may be formed at a left side of a reference line that connects an upper right edge of the pixel area and a lower left edge thereof, the second protrusion may be formed at a right side of the reference line, the first chamfered portion may be formed at an upper left edge of the pixel area of the pixel area, and the second chamfered portion may be formed at a lower right edge of the pixel area.

The first protrusion may overlap a second chamfered portion of a first different color filter which is upwardly adjacent to the color filter, and the second protrusion may overlap a first chamfered portion of a second different color filter which is downwardly adjacent to the color filter.

The first protrusion may be formed at a left side of a reference line that connects an upper left edge of the pixel area and a lower right edge thereof, the second protrusion may be formed at a right side of the reference line, the first chamfered portion may be formed at an upper right edge of the pixel area, and the second chamfered portion may be formed at a lower left side of the pixel area.

The first protrusion may overlap a first chamfered portion of a first different color filter which is leftwardly adjacent to the color filter, and the second protrusion may overlap a second chamfered portion of a second different color filter which is rightwardly adjacent to the color filter.

The first protrusion may be formed at a right side of a reference line that connects an upper left side of the pixel area and a lower right edge thereof, the second protrusion may be formed at a left side of the reference line, the first chamfered portion may be formed at an upper right edge of the pixel area, and the second chamfered portion may be formed at a lower left edge of the pixel area.

The first protrusion may overlap with a second chamfered portion of a first different color filter which is upwardly adjacent to the color filter, and the second protrusion may overlap a first chamfered portion of a second different color filter which is downwardly adjacent to the color filter.

The first protrusion and the second protrusion may be formed to be larger than the first chamfered portion and the second chamfered portion to overlap a portion of a body or a protrusion of an adjacent color filter.

Another exemplary embodiment is directed to providing a manufacturing method of a liquid crystal display, including: disposing a first color filter in a first pixel area of a display panel defining a plurality of pixel areas; disposing a second color filter in a second pixel area of the display panel; disposing a third color filter in a third pixel area of the display panel; and disposing a fourth color filter in a fourth pixel area of the display panel, wherein the first pixel area to the fourth pixel area overlap each other, and each of the first color filter to the fourth color filter includes two protrusions formed at two edges of four edges of the corresponding pixel area and two chamfered portions formed at the remaining edges thereof.

The first protrusion may be formed at a right side of a reference line that connects an upper right edge of the pixel area and a lower left edge thereof, the second protrusion may be formed at left side of the reference line, the first chamfered portion may be formed at an upper left edge of the pixel area, and the second chamfered portion may be formed at a lower right side of the pixel area.

The first protrusion may overlap a first chamfered portion of a first different color filter which is rightwardly adjacent to the color filter, and the second protrusion may overlap a second chamfered portion of a second different color filter which is leftwardly adjacent to the color filter.

The first protrusion may overlap a second chamfered portion of a first different color filter which is upwardly adjacent to the color filter, and the second protrusion may overlap a first chamfered portion of a second different color filter which is downwardly adjacent to the color filter.

The first protrusion may be formed at a left side of a reference line that connects an upper left edge of the pixel area and a lower right edge thereof, the second protrusion may be formed at a right side of the reference line, the first chamfered portion may be formed at an upper right edge of the pixel area, and the second chamfered portion may be formed at a lower left side of the pixel area.

The first protrusion may overlap a first chamfered portion of a first different color filter which is leftwardly adjacent to the color filter, and the second protrusion may overlap a second chamfered portion of a second different color filter which is rightwardly adjacent to the color filter.

The first protrusion may overlap a second chamfered portion of a first different color filter which is upwardly adjacent to the color filter, and the second protrusion may overlap a first chamfered portion of a second different color filter which is downwardly adjacent to the color filter.

The first color filter may be any one of a red color filter, a green color filter, a blue color filter, and a white color filter, the second color filter is another color filter thereof, the third color filter may be another color filter thereof, and the fourth color filter is the other color filter.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
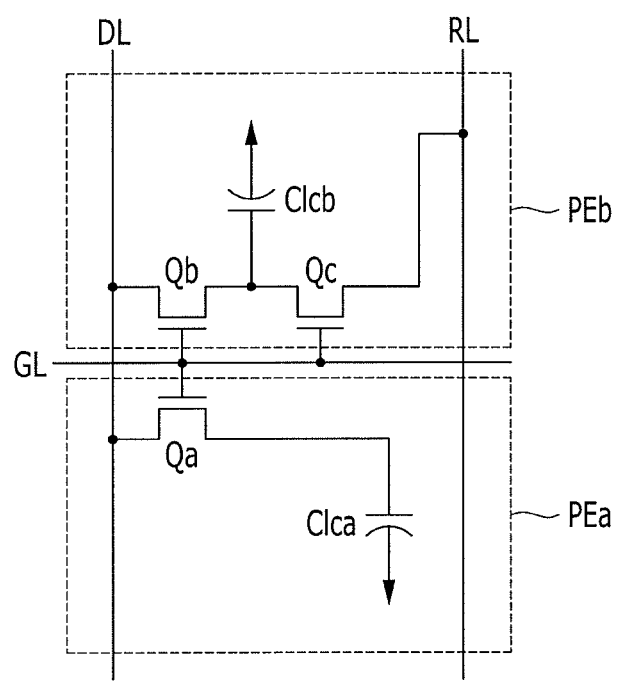
FIG. 1 illustrates an equivalent circuit of one pixel of a liquid crystal display according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

In addition, in various exemplary embodiments, the same constituent elements are denoted by the same reference numerals and are representatively described in an exemplary embodiment, and different elements from the elements of the exemplary embodiment are described in other exemplary embodiments.

In the drawings and this specification, parts or elements that are not related to the description hereof are omitted in order to clearly describe embodiments, and the same or like constituent elements are designated by the same reference numerals throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements. In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present.

FIG. 1 is an equivalent circuit of one pixel of a liquid crystal display according to an exemplary embodiment.

Referring to FIG. 1, one pixel PX of the liquid crystal display includes a plurality of signal lines including a gate line GL for transmitting a gate signal, a data line DL for transmitting a data signal, and a divided reference voltage line RL for transmitting a divided reference voltage, and first, second, and third switching elements Qa, Qb, and Qc and first and second liquid crystal capacitors Clca and Clcb that are connected to the plurality of signal lines.

The first switching element Qa includes a gate electrode connected to the gate line GL, a first electrode connected to the data line DL, and a second electrode connected to the first liquid crystal capacitor Clca.

The second switching element Qb includes a gate electrode connected to the gate line GL, a first electrode connected to the data line DL, and a second electrode connected to the second liquid crystal capacitor Clcb.

The third switching element Qc includes a gate electrode connected to the gate line GL, a first electrode connected to the divided voltage reference voltage line RL, and a second electrode connected to the second liquid crystal capacitor Clcb.

The first liquid crystal capacitor Clca includes a first electrode connected to the first switching element Qa and a second electrode connected to a common voltage.

The second liquid crystal capacitor Clcb includes a first electrode connected to the second switching element Qb and the third switching element Qc, and a second electrode connected to the common voltage.

When a gate-on voltage is applied to the gate line GL, the first switching element Qa, the second switching element Qb, and the third switching element Qc are turned on. In this case, a data voltage applied to the data line DL is applied to a first subpixel electrode PEa through the turned-on first switching element Qa, and is applied to a second subpixel electrode PEb through the turned-on second switching element Qb. The data voltage that is applied to the first subpixel electrode PEa is the same as the data voltage that is applied to the second subpixel electrode PEb, and the first liquid crystal capacitor Clca and the second liquid crystal capacitor Clcb are charged with the same voltage as a difference between the common voltage and the data voltage. Simultaneously, a voltage charged in the second liquid crystal capacitor Clcb is divided through the turned-on third switching element Qc. As a result, the voltage charged in the second liquid crystal capacitor Clcb is lowered by a difference between the common voltage and the divided reference voltage. In other words, the voltage charged in the first liquid crystal capacitor Clca is higher than the voltage charged in the second liquid crystal capacitor Clcb.

As such, the voltage charged in the first liquid crystal capacitor Clca is different from the voltage charged in the second liquid crystal capacitor Clcb. Since the voltage charged in the first liquid crystal capacitor Clca is different from the voltage charged in the second liquid crystal capacitor Clcb, an angle at which liquid crystal molecules are inclined in a first subpixel is different from an angle at which liquid crystal molecules are inclined in a second subpixel. Accordingly, luminance of the first pixel is different from that of the second subpixel. As a result, by appropriately adjusting the voltage of the first liquid crystal capacitor Clca and the voltage of the second liquid crystal capacitor Clcb, an image viewed from the side can be controlled to approach an image viewed from the front as closely as possible, thereby improving side visibility.

In the present exemplary embodiment, in order to make the voltage charged in the first liquid crystal capacitor Clca and the voltage charged in the second liquid crystal capacitor Clcb different, the third switching element Qc connected to the second liquid crystal capacitor Clcb and the divided voltage reference voltage line RL are provided.

However, in a liquid crystal display according to another exemplary embodiment, the second liquid crystal capacitor Clcb may be connected to a step-down capacitor. Specifically, a switching element including a first terminal connected to a step-down gate line, a second terminal connected to the second liquid crystal capacitor Clcb, and a third terminal connected to a step-down capacitor may be provided to charge some of electric charges charged in the second liquid crystal capacitor Clcb to the step-down capacitor. Accordingly, the voltages charged in the first liquid crystal capacitor Clca and the second liquid crystal capacitor Clcb may be different from each other.

Further, in the case of a liquid crystal display according to yet another exemplary embodiment, the first liquid crystal capacitor Clca and the second liquid crystal capacitor Clcb may be connected to different data lines to receive different data voltages, and thus the voltages charged in the first liquid crystal capacitor Clca and the second liquid crystal capacitor Clcb may be different from each other. In addition, there are various methods for differently charging the first liquid crystal capacitor Clca and the second liquid crystal capacitor Clcb.

Figure 2:
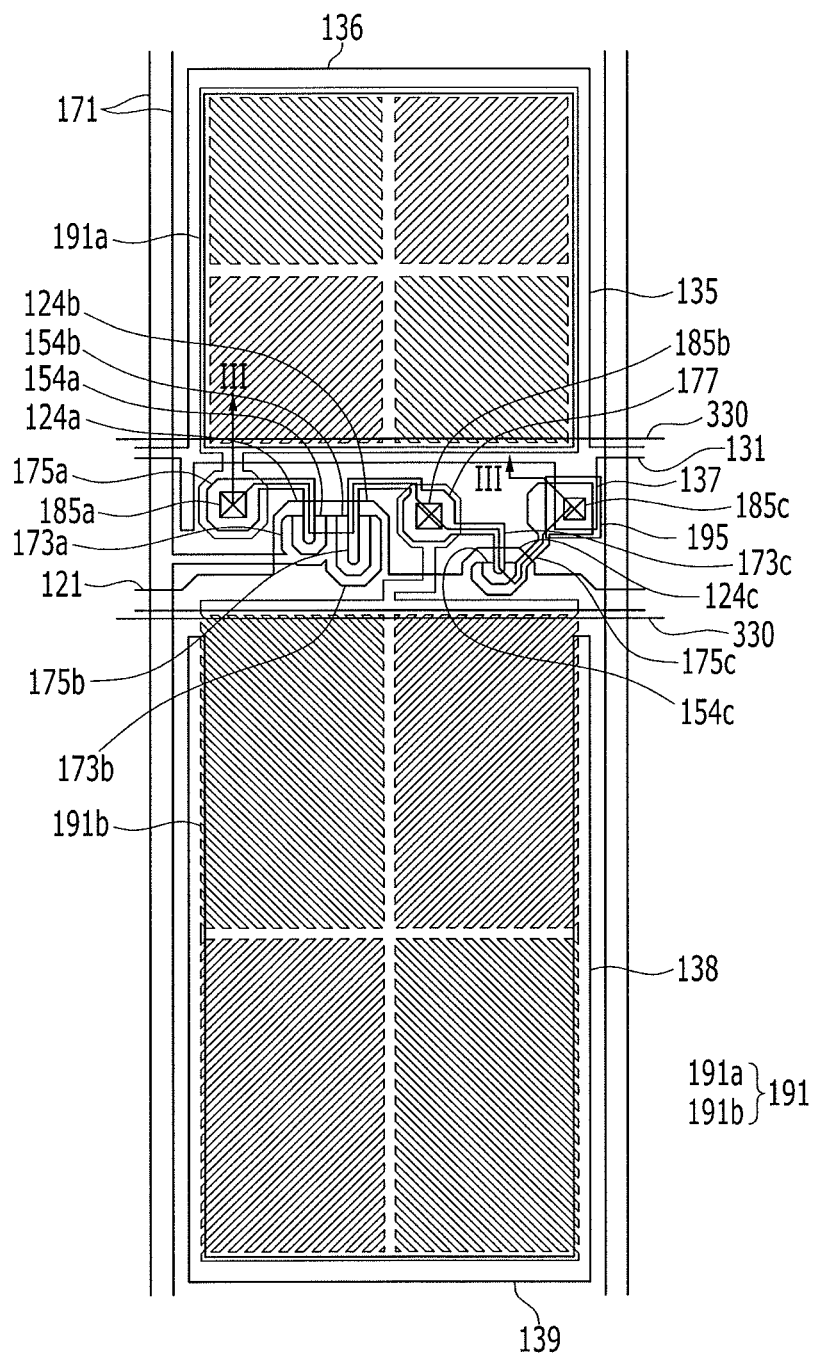
FIG. 2 illustrates a layout view of one pixel of an liquid crystal display according to an exemplary embodiment.
Figure 3:
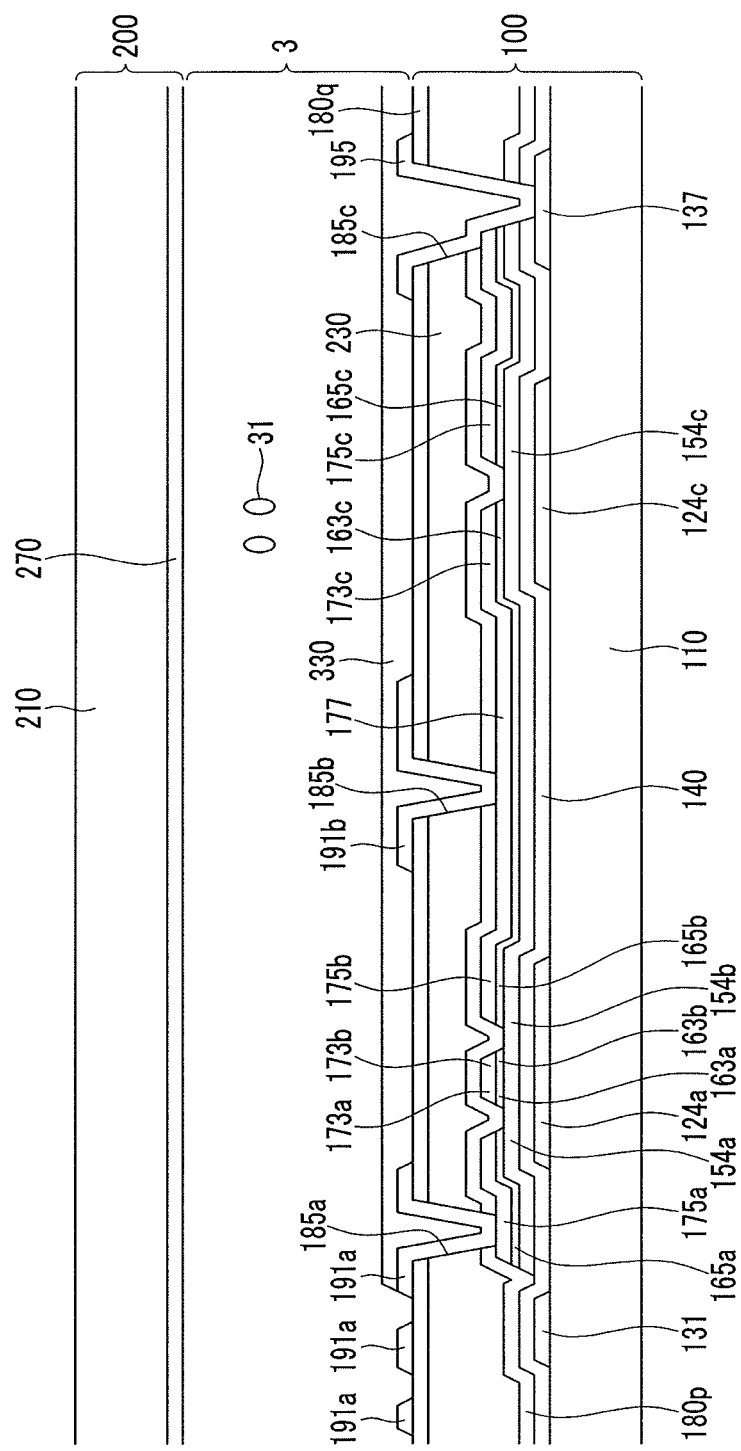
FIG. 3 illustrates a cross-sectional view of the liquid crystal display of FIG. 2 taken along the line III-III.

Hereinafter, the structure of the liquid crystal display shown in FIG. 1 will be described with reference to FIG. 2 and FIG. 3. FIG. 2 is a layout view of one pixel of a liquid crystal display according to an exemplary embodiment. FIG. 3 is a cross-sectional view of the liquid crystal display of FIG. 2 taken along the line III-III.

Referring to FIG. 2 and FIG. 3, the liquid crystal display according to the present exemplary embodiment includes a lower display panel 100 and an upper display panel 200 disposed to face each other, and a liquid crystal layer 3 interposed between the two display panels 100 and 200. Although not shown therein, the liquid crystal display may include a pair of polarizers attached to outer surfaces of the display panels 100 and 200.

First, the lower display panel 100 will be described.

A gate conductor including a gate line 121 and a divided voltage reference voltage line 131 may be formed on an insulating substrate 110 made of transparent glass, plastics, or the like.

The gate line 121 may include a first gate electrode 124a, a second gate electrode 124b, a third gate electrode 124c, and a wide end portion (not illustrated) for connection to another layer or an external driving circuit.

The divided voltage reference voltage line 131 may include first storage electrodes 135 and 136, and a reference electrode 137. Second storage electrodes 138 and 139 that overlap a second sub-pixel electrode 191b, but are not connected to the divided voltage reference voltage line 131, are shown.

A gate insulating layer 140 may be on the gate line 121 and the divided voltage reference voltage line 131. A first semiconductor 154a, a second semiconductor 154b, and a third semiconductor 154c may be on the gate insulating layer 140. A plurality of ohmic contacts 163a, 165a, 163b, 165b, 163c, and 165c may be on the semiconductors 154a, 154b, and 154c.

A data conductor may include a plurality of data lines 171 having a first source electrode 173a and a second source electrode 173b, a first drain electrode 175a, a second drain electrode 175b, a third source electrode 173c, and a third drain electrode 175c on the ohmic contacts 163a, 165a, 163b, 165b, 163c, and 165c, and the gate insulating layer 140.

The data conductor, and the semiconductors and the ohmic contacts positioned therebeneath, may be simultaneously formed using one mask.

The data line 171 may include a wide end portion (not illustrated) for connection with another layer or the external driving circuit.

The first gate electrode 124a, the first source electrode 173a, and the first drain electrode 175a, together with the first semiconductor 154a, form one first thin film transistor (TFT). The first thin film transistor is the first switching element Qa. A channel of the first thin film transistor is in the semiconductor 154a between the first source electrode 173a and the first drain electrode 175a.

The second gate electrode 124b, the second source electrode 173b, and the second drain electrode 175b together with the second semiconductor 154b form one second thin film transistor. The second thin film transistor is the second switching element Qb. A channel of the second thin film transistor may be in the semiconductor 154b between the second source electrode 173b and the second drain electrode 175b.

The third gate electrode 124c, the third source electrode 173c, and the third drain electrode 175c together with the third semiconductor 154c form one third thin film transistor. The third thin film transistor is the third switching element Qc. A channel of the third thin film transistor may be in the semiconductor 154c between the third source electrode 173c and the third drain electrode 175c.

The second drain electrode 175b is connected to the third source electrode 173c and may include a wide expansion 177.

A first passivation layer 180p is positioned on the data conductors 171, 173c, 175a, 175b, and 175c, and the exposed semiconductor layers 154a, 154b, and 154c. The first passivation layer 180p may include an inorganic insulating layer e.g., a silicon nitride or a silicon oxide. The first passivation layer 180p may prevent a pigment of a color filter 230 from flowing into the exposed semiconductor layers 154a, 154b, and 154c.

The color filter 230 may be formed on the first passivation layer 180p. The color filter 230 may extend in a vertical direction along two adjacent data lines. The color filter 230 may be formed as an island type so as to cover one pixel area.

A second passivation layer 180q may be on the color filter 230. The second passivation layer 180q may include an inorganic insulating layer, e.g., a silicon nitride or a silicon oxide. The second passivation layer 180q may prevent or reduce the color filter 230 from being lifted and may suppresses contamination of the liquid crystal layer 3 due to an organic material, e.g., a solvent, having flowed from the color filter 230, thereby preventing an abnormality, e.g., a residual image that may occur when a screen is driven.

A first contact hole 185a for exposing the first drain electrode 175a and a second contact hole 185b for exposing the second drain electrode 175b are formed in the first passivation layer 180p and the second passivation layer 180q.

A third contact hole 185c is positioned in the first passivation layer 180p, the second passivation layer 180q, and the gate insulating layer 140 to partially expose the reference electrode 137 and the third drain electrode 175c, and a connecting member 195 covers the third contact hole 185c. The connecting member 195 electrically couples the reference electrode 137 and the third drain electrode 175c that are exposed by the third contact hole 185c.

A plurality of pixel electrodes 191 may be on the second passivation layer 180q. The respective pixel electrodes 191 are separated from each other while interposing the gate line 121 therebetween, and may include a first subpixel electrode 191a and a second subpixel electrode 191b neighboring each other in a column direction based on the gate line 121. The pixel electrode 191 may be formed of a transparent conductive material, e.g., ITO, IZO, or the like, or a reflective metal, e.g., aluminum, silver, chromium, or an alloy thereof.

The first subpixel electrode 191a is physically electrically connected to the first drain electrode 175a through the first contact hole 185a. The second subpixel electrode 191b is physically electrically connected to the second drain electrode 175b through the second contact hole 185b The first subpixel electrode 191a receives a data voltage from the first drain electrode 175a. The second subpixel electrode 191b receives a data voltage from the second drain electrode 175b. In this case, some of the data voltage applied to the second drain electrode 175b is divided through the third source electrode 173c, so the magnitude of the voltage applied to the first subpixel electrode 191a is larger than that of the voltage applied to the second subpixel electrode 191b.

The first sub-pixel electrode 191a and the second subpixel electrode 191b to which the data voltage is applied generate an electric field together with a common electrode 270 of the upper display panel 200 to determine a direction of the liquid crystal molecules of the liquid crystal layer 3 between two electrodes 191 and 270. The luminance of light transmitted by the liquid crystal layer 3 is changed according to the direction of the liquid crystal molecules.

A light blocking member 330 may be positioned on the pixel electrode 191. The light blocking member 330 may cover all of a first transistor Qa, a second transistor Qb, and a third transistor Qc, as well as regions in which the first to third contact holes 185a, 185b, and 185c are positioned, and may extend in the same direction as the gate line 121 and, thus, overlaps a portion of the data line 171. The light blocking member 330 may be positioned to at least partially overlap with the two data lines 171 positioned at both sides of one pixel region to prevent light leakage that may occur around the data line 171 and the gate line 121, and to prevent light leakage in a region in which the first transistor Qa, the second transistor Qb, and the third transistor Qc are disposed.

Now, the upper display panel 200 will be described.

The common electrode 270 may be on an insulating substrate 210. An upper alignment layer (not shown) may be on the common electrode 270. The upper alignment layer may be a vertical alignment layer.

The liquid crystal layer 3 has negative dielectric anisotropy, and liquid crystal molecules 31 of the liquid crystal layer 3 are aligned such that their long axes are perpendicular to the surfaces of the two display panel 100 and 200 while no electric field is present.

Hitherto, it has been described that the color filter 230 is disposed in the lower display panel 100, but the color filter 230 may be disposed in the upper display panel 200. In this case, the color filter 230 may be disposed between the insulation substrate 210 and the common electrode 270, or the color filter 230 may be disposed on the common electrode 270 and covered with an additional passivation layer.

Hereinafter, the color filter 230 that is formed as the island type in a liquid crystal display according to an exemplary embodiment will be described in more detail.

Figure 4:
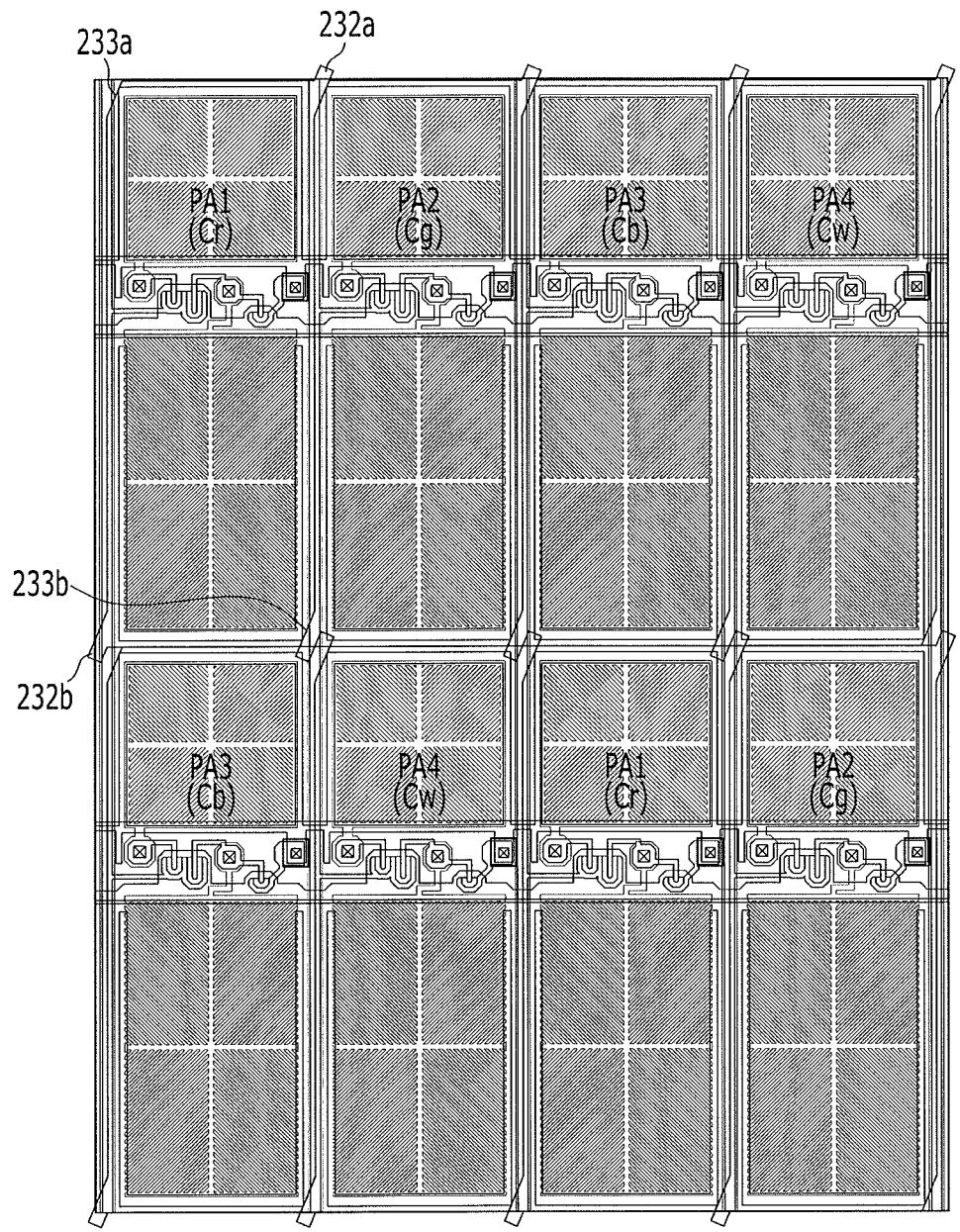
FIG. 4 illustrates a top plan view of a liquid crystal display according to an exemplary embodiment.

FIG. 4 is a top plan view of a liquid crystal display according to an exemplary embodiment.

Referring to FIG. 4, a plurality of pixel areas PA are defined in at least one of the lower panel 100 and the upper panel 200 of the liquid crystal display. A plurality of color filters Cr, Cg, Cb, and Cw are respectively disposed in the pixel areas PA. In this case, four different color filters Cr, Cg, Cb, and Cw are respectively disposed in four adjacent pixel areas PA. For example, the liquid crystal display includes a color filter layer including the color filters Cr, Cg, Cb, and Cw which are respectively disposed in a plurality of pixel areas PA1, PA2, PA3, and PA4. The red color filter Cr, the green color filter Cg, the blue color filter Cb, and the white color filter Cw are respectively disposed in the first pixel area PA1, the second pixel area PA2, the third pixel area PA3, and the fourth pixel area PA4.

The red color filter Cr may be formed by patterning a photoresist containing a red pigment on the first pixel area PA1. The green color filter Cg may be formed by patterning a photoresist containing a green pigment on the second pixel area PA2. The blue color filter Cb may be formed by patterning a photoresist containing a green pigment on the third pixel area PA3. The white color filter Cw may be formed by patterning a photoresist containing a white pigment on the fourth pixel area PA4. In this way, the red color filter Cr, the green color filter Cg, the blue color filter Cb, and the white color filter Cw may be disposed as an island type. The disposition sequence of the four color filters Cr, Cg, Cb, and Cw is not limited thereto.

Each of the four color filters Cr, Cg, Cb, and Cw includes a body 231 (see FIGS. 5 to 8), two protrusions 232a and 232b formed at two of four edges or corners of the corresponding pixel area PA, and two chamfered portions 233a and 233b formed at the remaining two edges or corners thereof. The protrusions 232a and 232b of each of the color filters Cr, Cg, Cb, and Cw overlap respective ones of the two chamfered portions 233a and 233b that are adjacent thereto. Sides of the chamfered portions 233a and 233b may be parallel with sides of the protrusions 232a and 232b in the protruding direction thereof, which, in turn, may be parallel to a reference line CL (see FIGS. 5 to 8) that connect a diagonally opposing corners of the body 231. In particular, the body 231 of each color filter may be generally rectangular, with protrusions 232a and 232b extending therefrom and chamfered portions 233a and 233b beveled there into, i.e., cuts off a corner in the generally rectangular body. However, the body may have other shapes, e.g., other polygons.

As described above, the first protrusion 232a of each of the color filters Cr, Cg, Cb, and Cw may overlap the first chamfered portion 233a of each of the color filters Cr, Cg, Cb, and Cw, which is rightwardly adjacent thereto, and the second protrusion 232b thereof may overlap the second chamfered portion 233b of each of the color filters Cr, Cg, Cb, and Cw, which is leftwardly adjacent thereto.

As such, when the red, green, blue, and white color filters Cr, Cg, Cb, and Cw are respectively disposed in the first to fourth pixel areas PA1 to PA4 as the island type, the protrusions 232a and 232b and the chamfered portions 233a and 233b of each of the color filters Cr, Cg, Cb, and Cw may be formed at portions at which the first to fourth pixel areas PA1 to PA4 overlap each other such that the protrusions 232a and 232b overlap the chamfered portions 233a and 233b of the color filters Cr, Cg, Cb, and Cw which are adjacent thereto. In this way, light leakage phenomenon generated at opened portions that are formed as edge portions at which edges of the pixel areas PA meet each other are not completely covered by the color filters Cr, Cg, Cb, and Cw, or may be caused by steps formed as the color filters Cr, Cg, Cb, and Cw may be reduced or eliminated.

The pixel structure including pixel circuits, pixel shapes, voltage application types, and the like is merely an example, but may be variously changed.

Hereinafter, first to fourth examples of the island type color filters Cr, Cg, Cb, and Cw will be described with reference to FIG. 5 to FIG. 8.

Figure 5:
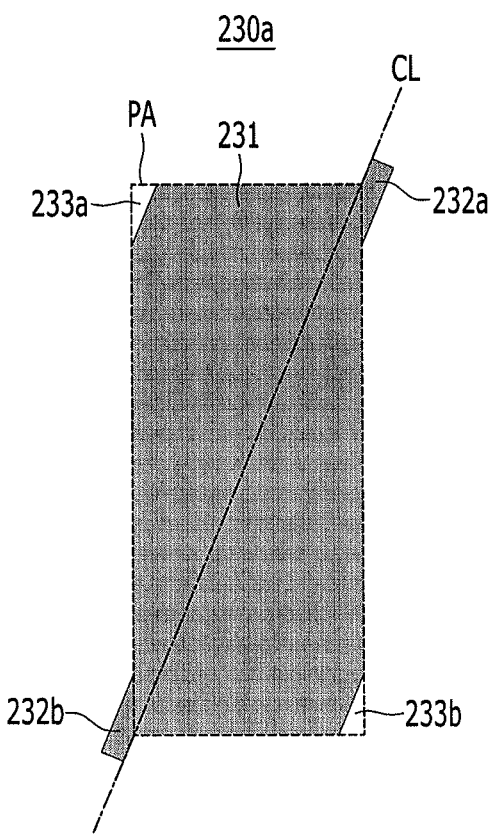
FIG. 5 illustrates a top plan view of a color filter of a liquid crystal display according to a first example.

FIG. 5 illustrates a top plan view of a color filter 230a of a liquid crystal display according to a first example. Referring to FIG. 5, the color filter 230a includes the body 231 that covers most areas of the pixel area PA, the first protrusion 232a, and the second protrusion 232b that are respectively formed at two edges or corners of the pixel area PA which diagonally face each other, and the first chamfered portion 233a and the second chamfered portion 233b that are formed at the remaining edges or corners of the pixel area PA.

Specifically, the first protrusion 232a is at a right side of a reference line CL that connects an upper right edge of the pixel area PA and a lower left edge thereof, and the second protrusion 232b is at a left side of the reference line CL. The first chamfered portion 233a is at an upper right edge of the pixel area PA and the second chamfered portion 233b formed at a lower right edge of the pixel area PA. The first protrusion 232a overlaps the first chamfered portion 233a of a first different color filter 230 which is rightwardly adjacent to the color filter 230. The second protrusion 232b overlaps the second chamfered portion 233b of a second different color filter 230 which is leftwardly adjacent to the color filter 230.

Figure 6:
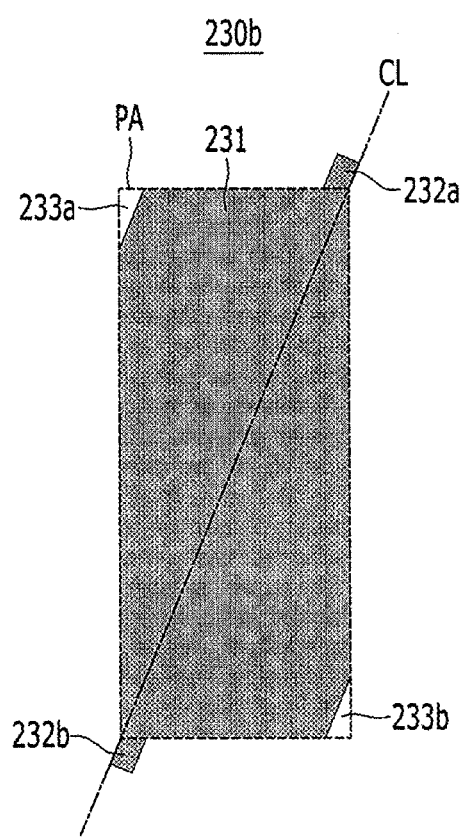
FIG. 6 illustrates a top plan view of a color filter of a liquid crystal display according to a second example.

FIG. 6 is a top plan view of a color filter 230b of a liquid crystal display according to a second example. Referring to FIG. 6, the first protrusion 232a is at the left side of the reference line CL that connects the upper right edge of the pixel area PA and the lower left edge thereof, and the second protrusion 232b is at the right side of the reference line CL. The first chamfered portion 233 is at the upper right edge of the pixel area PA, and the second chamfered portion 233b is at the lower right edge of the pixel area PA. The first protrusion 232a overlaps the second chamfered portion 233b of a first different color filter 230 which is upwardly adjacent to the color filter 230. The second protrusion 232b overlaps with the first chamfered portion 233a of a second different color filter 230 which is downwardly adjacent to the color filter 230.

Figure 7:
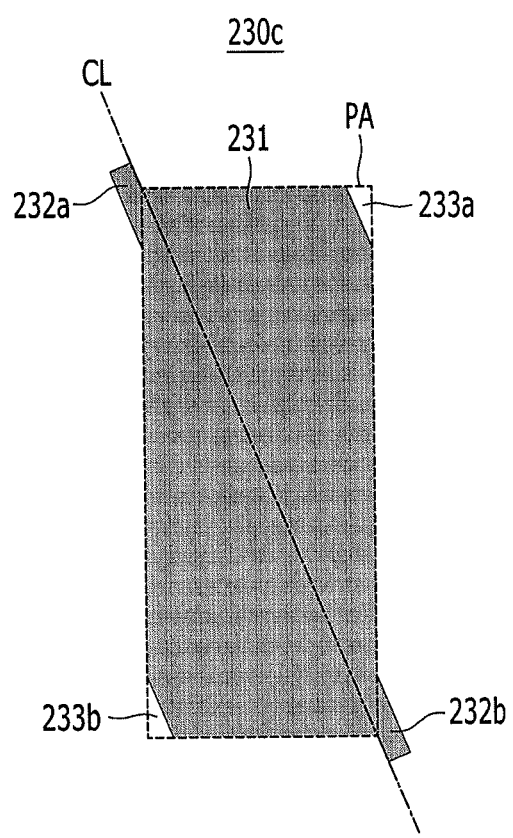
FIG. 7 illustrates a top plan view of a color filter of a liquid crystal display according to a third example.

FIG. 7 is a top plan view of a color filter 230c of a liquid crystal display according to a third example. Referring to FIG. 7, the first protrusion 232a is at a left side of a reference line CL that connects an upper left edge of the pixel area PA and a lower right edge thereof, and the second protrusion 232b is at a right side of the reference line CL. The first chamfered portion 233a is formed at an upper right edge of the pixel area PA, and the second chamfered portion 233b is formed at a lower left edge of the pixel area PA. The first protrusion 232a overlaps the first chamfered portion 233a of a first different color filter 230 which is leftwardly adjacent to the color filter 230. The second protrusion 232b overlaps the second chamfered portion 233b of a second different color filter 230 which is rightwardly adjacent to the color filter 230.

Figure 8:
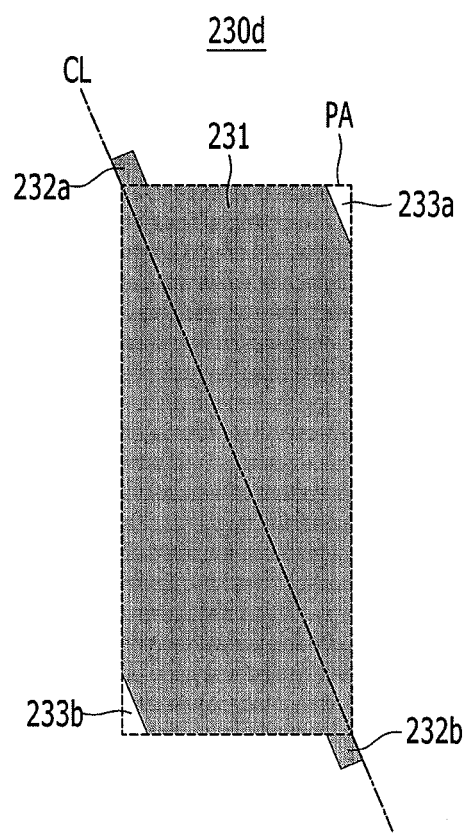
FIG. 8 illustrates a top plan view of a color filter of a liquid crystal display according to a fourth example.

FIG. 8 is a top plan view of a color filter 230d of a liquid crystal display according to a fourth tet example. Referring to FIG. 8, the first protrusion 232a is at the right side of the reference line CL that connects the upper left edge of the pixel area PA and the lower right edge thereof, and the second protrusion 232b is at the left side of the reference line CL. The first chamfered portion 233a is at the upper right edge of the pixel area PA, and the second chamfered portion 233b is at the lower left edge of the pixel area PA. The first protrusion 232a overlaps the second chamfered portion 233b of a first different color filter 230 which is upwardly adjacent to the color filter 230. The second protrusion 232b overlaps the first chamfered portion 233a of a second different color filter 230 which is downwardly adjacent to the color filter 230.

In the present exemplary embodiment, each of the protrusions 232a and 232b is illustrated to have a quadrangular shape, and each of the chamfered portions 233a and 233b is illustrated to have such a shape so as to be chamfered in parallel with the protrusions 232a and 232b. However, the shapes of the protrusions 232a and 232b and the chamfered portions 233a and 233b may be variously changed without being limited thereto. For example, the protrusions 232a and 232b may be formed to have various shapes such as circles, ovals, and triangles, and the chamfered portions 233a and 233b may be formed to have engraved shapes corresponding to the shapes of the protrusions 232a and 232b.

As noted above, the first protrusion 232a and second protrusion 232b may overlap the body 231 of the adjacent color filter 230 or portions of the protrusions 232a and 232b of the adjacent color filter 230. This will be described with reference to FIG. 9 and FIG. 10.

Figure 9:
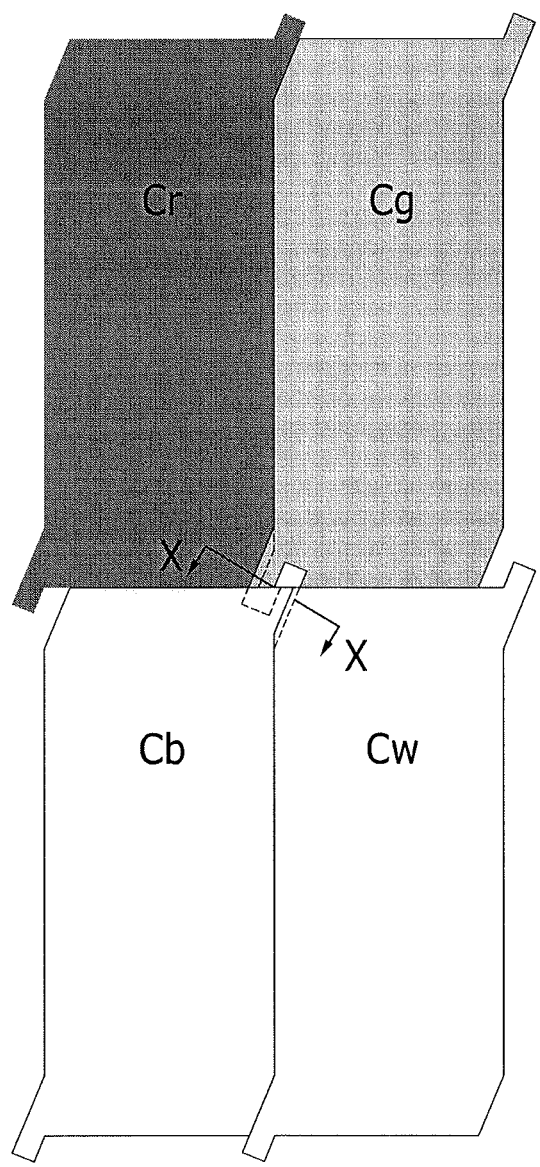
FIG. 9 illustrates a top plan view illustrating how four color filters are disposed in a liquid crystal display according to an exemplary embodiment.
Figure 10:
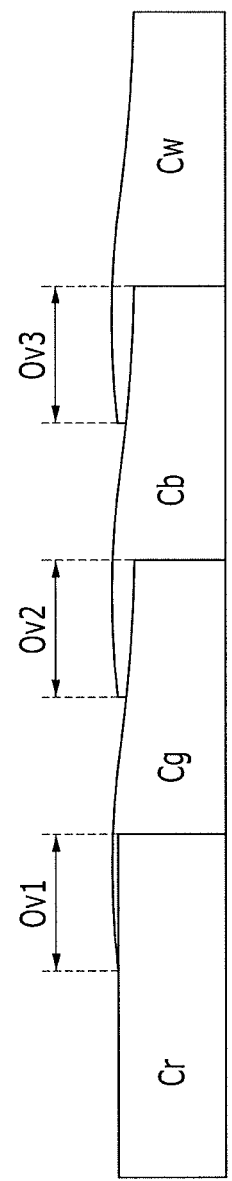
FIG. 10 illustrates a cross-sectional view of the four color filters of FIG. 9 taken along the line X-X.

FIG. 9 illustrates a top plan view of how four color filters are disposed in a liquid crystal display according to an exemplary embodiment. FIG. 10 illustrates a cross-sectional view of the four color filters of FIG. 9 taken along the line X-X.

In FIGS. 9 and 10, the disposition order of the four color filters Cr, Cg, Cb, and Cw is merely an example and is not restrictive. In other words, any one of the four color filters Cr, Cg, Cb, and Cw is patterned and disposed, another color filter is patterned and disposed, yet another color filter is patterned and disposed, and still another color filter is patterned and disposed, and so forth.

Herein, it is assumed that the red color filter Cr, the green color filter Cg, the blue color filter Cb, and the white color filter Cw are sequentially patterned and disposed.

In cross-sections of the bodies of the red color filter Cr, the green color filter Cg, the blue color filter Cb, and the white color filter Cw which meet each other, the protrusion of the green color filter Cg overlaps the body of the red color filter Cr by a first overlap length Ov1, the protrusion of the blue color filter overlaps the protrusion of the green color filter Cg by a second overlap length Ov2, and the body of the white color filter Cw overlaps the protrusion of the blue color filter Cb by a third overlap length Ov3.

Since the protrusion of the green color filter Cg and the protrusion of the blue color filter Cb are larger, i.e., have a greater surface area, than chamfered portions of the red color filter Cr and the white color filter Cw, the protrusions overlap respectively adjacent bodies. The first to third overlap lengths Ov1, Ov2, and Ov3 may be about 5 µm.

Similarly, the protrusions of the green color filter Cg, the red color filter Cr, the blue color filter Cb, and the white color filter Cw are larger, i.e., have a greater surface area, than those of the chamfered portions. Accordingly, similar to the first to third overlap lengths Ov1, Ov2, and Ov3, overlap lengths are formed. In this case, the two color filters overlap each other by the overlap lengths.

In a process for disposing the four color filters Cg, Cr, Cb, and Cw, even if the color filters Cg, Cr, Cb, and Cw are distorted within a range of ±2.5 µm, no gap is formed between the color filters Cg, Cr, Cb, and Cw.

Conventionally, the light leakage phenomenon may be generated at an opened portion that is formed as the edge portions at which the edges of the four color filters meet each other are not completely covered by the color filters. Further, the light leakage phenomenon may be caused by steps formed as all the color filters are overlap each other. This will be described with reference to FIG. 11 to FIG. 13.

Figure 11:
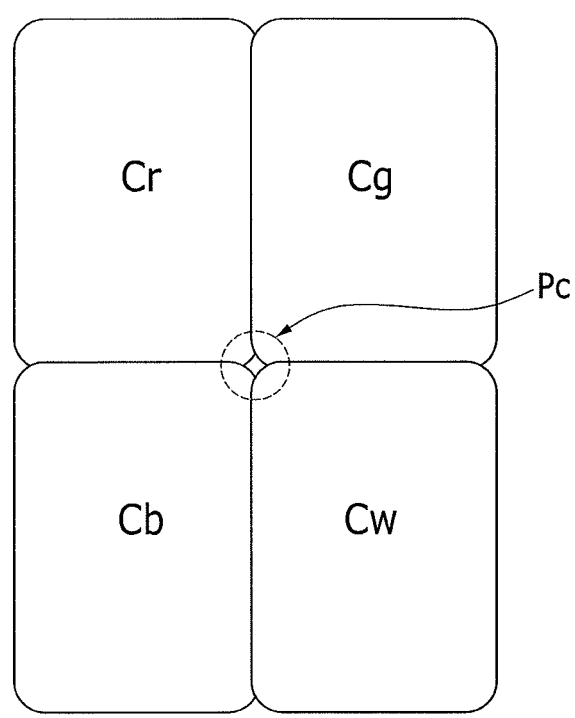
FIG. 11 and FIG. 12 illustrate top plan views of how four color filters are disposed in a liquid crystal display according to comparative embodiments.
Figure 12:
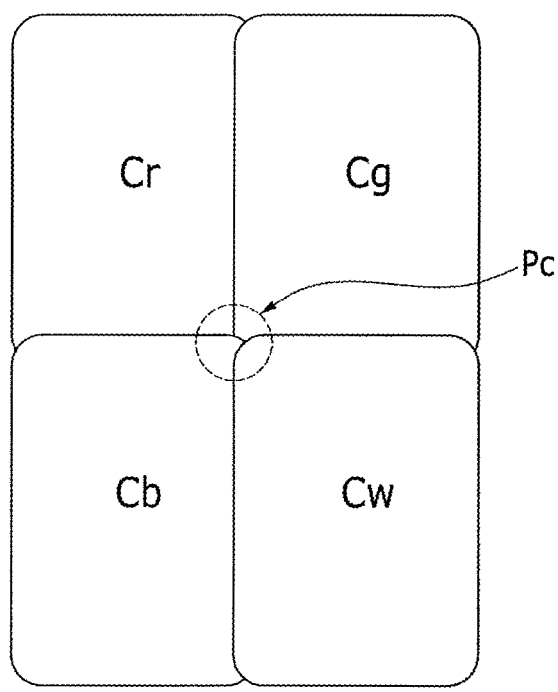
Figure 13:
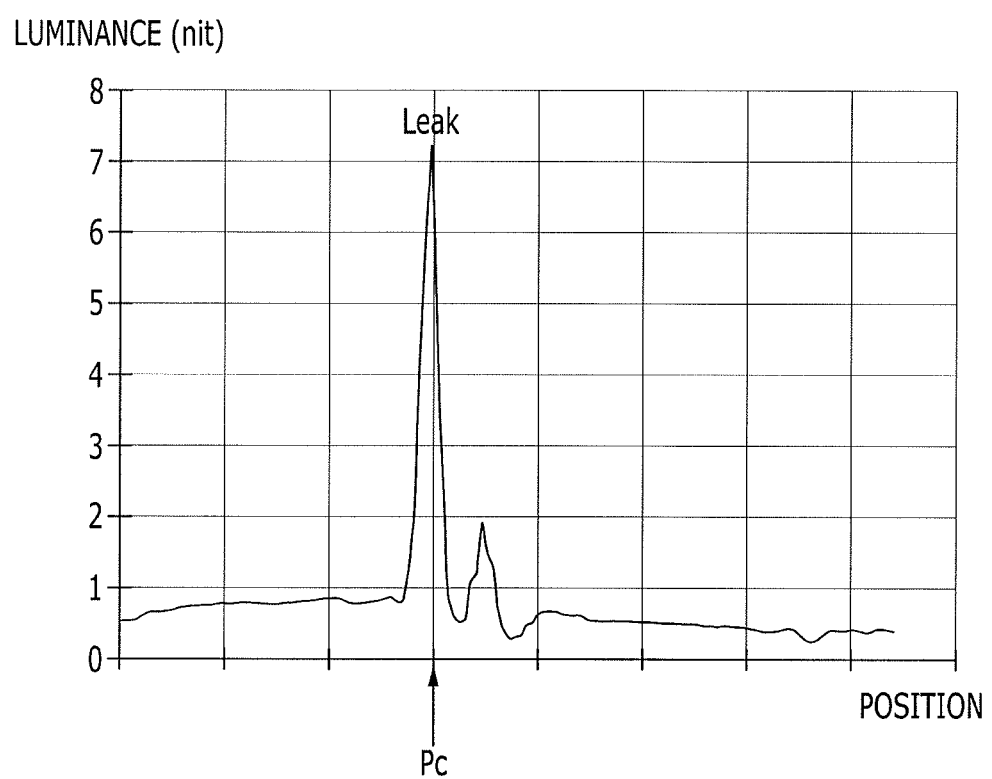
FIG. 13 illustrates a graph illustrating a result of measuring light leakage according to the disposition structure of the four color filters according to comparative embodiments.

FIG. 11 and FIG. 12 are top plan views how four color filters are disposed in a liquid crystal display according to comparative embodiments. FIG. 13 is a graph illustrating a result of measuring light leakage according to the disposition structure of the four color filters according to the comparative embodiments.

Referring to FIG. 11 to FIG. 13, the four color filters Cr, Cg, Cb, and Cw according to the comparative embodiments are designed to have quadrangular shapes. When an exposure process is performed to form the color filters Cr, Cg, Cb, and Cw, edge portions of the color filters Cr, Cg, Cb, and Cw may not be formed at a complete right angle. As a result, a portion Pc at which edges of the four color filters Cr, Cg, Cb, and Cw meet each other is formed to include an open region as shown in FIG. 11. A light leakage phenomenon is generated through the open region.

Further, as shown in FIG. 12, when the four color filters Cr, Cg, Cb, and Cw overlap each other to not form an open region, all of the four Cr, Cg, Cb, and Cw overlap each other at the portion Pc at which edges of the four color filters Cr, Cg, Cb, and Cw meet each other. As a result, the color filter layer of the portion Pc at which the edges of the four color filters Cr, Cg, Cb, and Cw meet each other is thick, thereby generating a light leakage phenomenon caused by steps.

From the graph of FIG. 13 illustrating a measurement result, it is seen that the light leakage phenomenon is significantly generated at the conventional portion Pc at which the edges of the four color filters Cr, Cg, Cb, and Cw meet each other. This light leakage is more significantly visible in a non-driven state or when black is displayed, thereby deteriorating display quality of the liquid crystal display.

However, according to one or more embodiments, by forming the four color filters Cg, Cr, Cb, and Cw with two protrusions and two chamfered portions, two color filters overlap each other by an overlap length without generating any gap between the four color filters Cg, Cr, Cb, and Cw. Accordingly, it is possible to solve the conventional problem that the light leakage phenomenon is caused by steps resulting when all color filters overlap each other.

Embodiments have been made in an effort to provide a liquid crystal display including an island type of color filter, and a manufacturing method thereof, having advantages of being capable of reducing a light leakage phenomenon.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A liquid crystal display comprising:
a first display panel defining a plurality of pixel areas;
a second display panel facing the first display panel;
a liquid crystal layer between the first display panel and the second display panel; and
a plurality of color filters in the respective pixel areas, wherein
each of the color filters includes at least one protrusion at edges of the corresponding pixel area and at least one chamfered portion formed at edges thereof, and wherein
the at least one protrusion and the at least one chamfered portion are positioned at different edges of the corresponding pixel area, and
the at least one protrusion of each of the color filters overlaps a chamfered portion of a color filter that is adjacent to each of the color filters.

2. The liquid crystal display as claimed in claim 1, wherein each of the color filters includes a body configured to cover most of the corresponding pixel area, first and second protrusions at first and second edges of the corresponding pixel area, and first and second chamfered portions formed at third and fourth edges thereof, wherein:
the first protrusion and the second protrusion respectively at the first and second edges of the corresponding pixel area that diagonally face each other; and
the first chamfered portion and the second chamfered portion respectively formed at the third and fourth edges of the corresponding pixel area that diagonally face each other.

3. The liquid crystal display as claimed in claim 2, wherein:
the first protrusion is at a right side of a reference line that connects an upper right edge of the corresponding pixel area and a lower left edge thereof,
the second protrusion is at left side of the reference line,
the first chamfered portion is at an upper left edge of the corresponding pixel area, and
the second chamfered portion is at a lower right side of the corresponding pixel area.

4. The liquid crystal display as claimed in claim 3, wherein:
the first protrusion overlaps a first chamfered portion of a first color filter which is rightwardly adjacent to the color filter, and
the second protrusion overlaps a second chamfered portion of a second color filter which is leftwardly adjacent to the color filter.

5. The liquid crystal display as claimed in claim 2, wherein:
the first protrusion is at a left side of a reference line that connects an upper right edge of the corresponding pixel area and a lower left edge thereof,
the second protrusion is at a right side of the reference line,
the first chamfered portion is at an upper left edge of the pixel area of the corresponding pixel area, and
the second chamfered portion is at a lower right edge of the corresponding pixel area.

6. The liquid crystal display as claimed in claim 5, wherein:
the first protrusion overlaps a second chamfered portion of a first color filter upwardly adjacent to the color filter, and
the second protrusion overlaps a first chamfered portion of a second color filter downwardly adjacent to the color filter.

7. The liquid crystal display as claimed in claim 2, wherein:
the first protrusion is at a left side of a reference line that connects an upper left edge of the corresponding pixel area and a lower right edge thereof,
the second protrusion is at a right side of the reference line,
the first chamfered portion is at an upper right edge of the corresponding pixel area, and
the second chamfered portion is at a lower left side, of the corresponding pixel area.

8. The liquid crystal display as claimed in claim 7, wherein:
the first protrusion overlaps a first chamfered portion of a first color filter leftwardly adjacent to the color filter, and
the second protrusion overlaps a second chamfered portion of a second color filter rightwardly adjacent to the color filter.

9. The liquid crystal display as claimed in claim 2, wherein:
the first protrusion is at a right side of a reference line that connects an upper left side of the corresponding pixel area and a lower right edge thereof,
the second protrusion is at a left side of the reference line,
the first chamfered portion is at an upper right edge of the corresponding pixel area, and
the second chamfered portion is at a lower left edge of the corresponding pixel area.

10. The liquid crystal display as claimed in claim 9, wherein:
the first protrusion overlaps a second chamfered portion of a first color filter upwardly adjacent to the color filter, and
the second protrusion overlaps a first chamfered portion of a second color filter downwardly adjacent to the color filter.

11. The liquid crystal display as claimed in claim 2, wherein:
the first protrusion and the second protrusion have a larger surface areas than the first chamfered portion and the second chamfered portion such that the first and second protrusions overlap a portion of a body or a protrusion of an adjacent color filter.

12. The liquid crystal display as claimed in claim 1, wherein each of the color filters includes a body configured to cover most of the corresponding pixel area, first and second protrusions at first and second edges of the corresponding pixel area, and first and second chamfered portions formed at third and fourth edges thereof, the body being substantially rectangular,
the first and second protrusions extend from first and second opposing corners of the body; and
the first and second chamfers cut off third and fourth opposing corners of the body.

* * * * *